United States Patent
Rohaly et al.

(10) Patent No.: US 6,532,631 B2
(45) Date of Patent: Mar. 18, 2003

(54) FOUR PIECE CABLE TIE

(75) Inventors: Joseph S. Rohaly, Frankfort, IL (US); David W. West, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/790,964

(22) Filed: Feb. 22, 2001

(65) Prior Publication Data

US 2001/0025399 A1 Oct. 4, 2001

Related U.S. Application Data

(60) Provisional application No. 60/184,547, filed on Feb. 24, 2000, and provisional application No. 60/239,493, filed on Oct. 11, 2000.

(51) Int. Cl.[7] .............................................. E05B 75/00
(52) U.S. Cl. ................... 24/16 PB; 24/30.5 P; 24/16 R; 70/16; 248/74.3
(58) Field of Search ......................... 24/16 PB, 30.5 P, 24/16 R, 17 AP, 30.5 S, 442, 17 R, 3.13; 70/14–16; 248/74.1, 74.3, 73, 74, 62

(56) References Cited

U.S. PATENT DOCUMENTS

| | | | |
|---|---|---|---|
| 3,186,047 A | | 6/1965 | Schwester et al. |
| 3,408,699 A | | 11/1968 | Reynolds |
| 3,654,669 A | | 4/1972 | Fulton |
| 3,739,429 A | | 6/1973 | Kohke |
| 4,333,210 A | * | 6/1982 | Burnett ...................... 24/16 PB |
| 4,422,217 A | | 12/1983 | Barrette |
| 4,574,434 A | * | 3/1986 | Shupe et al. ............... 24/16 PB |
| 4,653,155 A | | 3/1987 | Hara |
| 4,680,834 A | | 7/1987 | Andre et al. |
| 4,728,064 A | * | 3/1988 | Caveney ..................... 24/16 PB |
| 4,897,899 A | * | 2/1990 | Shely et al. ............... 24/16 PB |
| 4,993,699 A | | 2/1991 | Dyer |
| 5,088,158 A | * | 2/1992 | Burkholder .................. 128/879 |
| 5,102,075 A | | 4/1992 | Dyer |
| 5,106,323 A | * | 4/1992 | Gerhard ...................... 439/394 |
| 5,121,524 A | | 6/1992 | Mortensen |
| 5,193,251 A | | 3/1993 | Fortsch |
| 5,333,822 A | * | 8/1994 | Benoit et al. .................. 24/508 |
| 5,517,727 A | | 5/1996 | Bernard et al. |
| 5,544,391 A | | 8/1996 | Hoffman |
| 5,651,376 A | * | 7/1997 | Thompson .................. 128/878 |
| 5,687,456 A | * | 11/1997 | Chang ....................... 24/16 PB |
| 6,022,351 A | * | 2/2000 | Bremer et al. ................. 606/72 |
| 6,151,761 A | * | 11/2000 | Thompson ................ 24/16 PB |
| 6,196,033 B1 | * | 3/2001 | Dowdle .................... 24/16 PB |
| 6,332,248 B1 | * | 12/2001 | Daniggelis et al. ....... 24/16 PB |

FOREIGN PATENT DOCUMENTS

| | | | | |
|---|---|---|---|---|
| EP | 0 510 669 A2 | | 10/1992 | |
| EP | 0 662 429 A1 | | 7/1995 | |
| GB | 2243401 A | * | 10/1991 | ............... 24/16 PB |

* cited by examiner

Primary Examiner—J. J. Swann
Assistant Examiner—André L. Jackson
(74) Attorney, Agent, or Firm—Robert A. McCann; Jay A. Saltzman; Christopher S. Clancy

(57) ABSTRACT

A cable tie for bundling together a plurality of elongated objects, the cable tie including an elongated flexible strap having opposing ends, a locking head defining a pair of strap passageways, each of the passageways having an inlet end and an outlet end, and a pair of locking devices, each of the pair being mounted to the locking head and at least partially within one of the passageways, the locking devices being configured and oriented relative to the respective passageways so as to permit the ends of the strap to be inserted into the inlet ends of the passageways, and threaded through the passageways, such that the ends emerge from the outlet ends of the passageways, the locking devices being unidirectional so as to prevent the strap ends from being pulled back through the respective passageways in a direction moving from the outlet ends back toward the inlet ends.

11 Claims, 6 Drawing Sheets

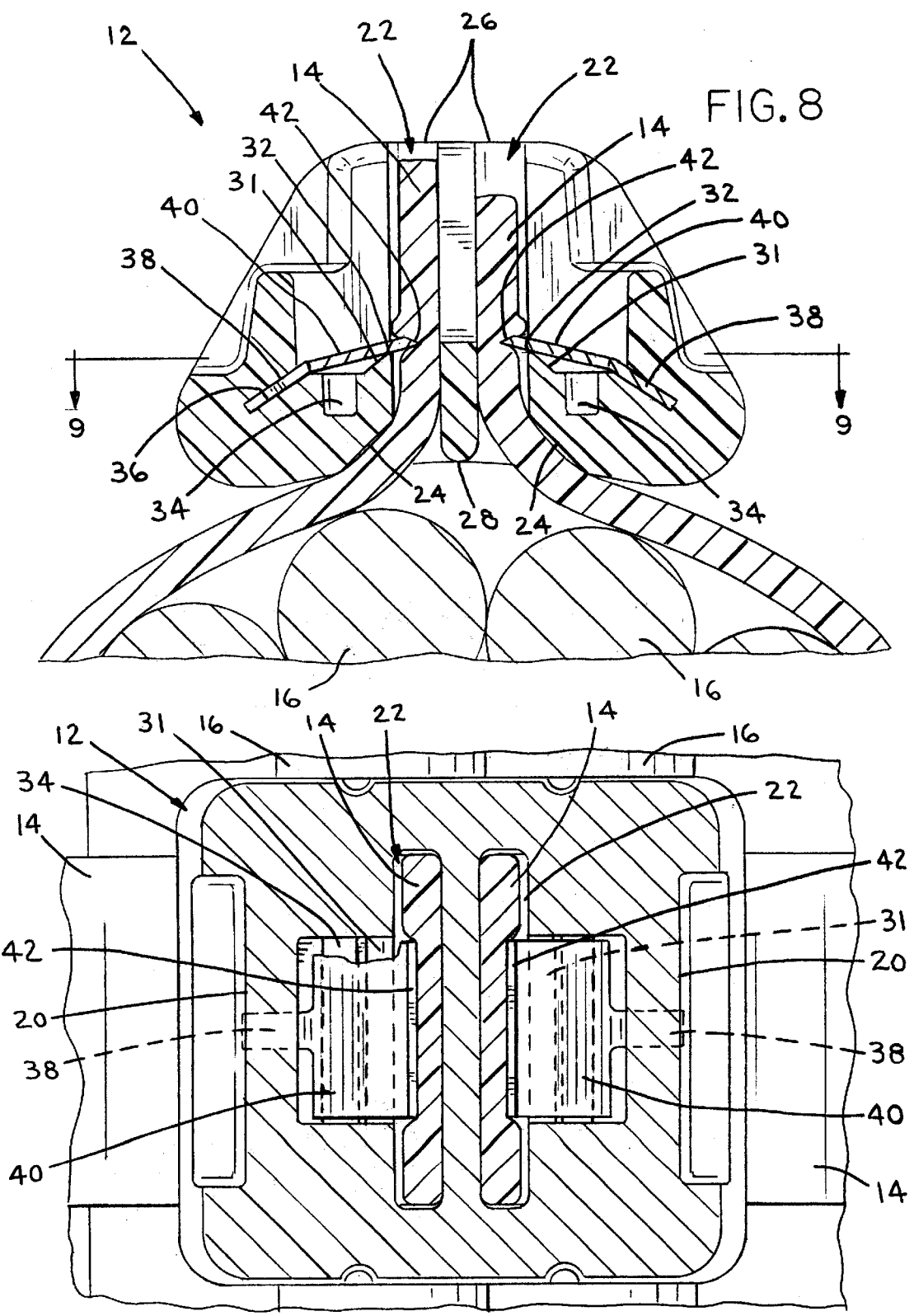

FOUR PIECE CABLE TIE

DESCRIPTION OF THE PREFERRED EMBODIMENT

This application claims the benefit of U.S. Provisional Application No. 60/184,547, filed Feb. 24, 2000, and U.S. Provisional Application No. 60/239,493 filed Oct. 11, 2000.

TECHNICAL FIELD

The present invention relates generally to cable tie fasteners for securing elongate objects in a bundle and more particularly to an improved locking head for a cable tie fastener.

BACKGROUND OF THE INVENTION

A wide variety of cable ties are well known and in use for the securing and bundling of wires and cables in a variety of applications. Prior cable ties have utilized straps integrally formed with a locking head as well as separate straps that engage with a locking mechanism of the non-integral locking head. Prior cable ties have also utilized various forms of an integrally formed locking pawl or a metal locking clip to act as the locking mechanism. In certain applications such as installing communication wiring on outdoor poles, the cable ties need to be able to withstand the external environmental elements. Cable ties used in these environments are preferably made of a material which can provide excellent weatherability, high UV and corrosion resistance, have low moisture absorption and have flexibility at low temperatures. Polyoxymethylene (POM) polymers commonly known as acetals possess the desired characteristics noted above. Certain differences in the properties of the acetal material verses the commonly used nylon material for cable ties leads to a number of changes in the manufacture of bundling straps using the acetal materials. Specifically, the acetal materials do not flow easily in an injection molding process where an integrally formed strap also needs to be filled. Thus, cable tie fasteners made from acetal materials generally utilize a locking head and a separate bundling strap.

For all types of cable ties it is generally a goal to provide a cable tie that has a relatively high loop tensile strength but has a low strap insertion force. It is also a factor in designing cable ties to consider ease of manufacturing. Many of the designs which provide satisfactory ratios of loop tensile strength to strap insertion force have manufacturing difficulties which add to the costs. Therefore, improvement in the art is desired.

SUMMARY OF THE INVENTION

It is therefore an object of the present invention to provide an improved cable tie.

It is a further object of the present invention to provide an improved locking head for a cable tie.

It is still further an object of the present invention to provide an improved cable tie made of acetal resins or any similar propertied material.

In one embodiment, the invention is a cable tie for bundling together a plurality of elongated objects. The cable tie includes an elongated flexible strap having opposing ends, a locking head defining a pair of strap passageways, each of the passageways having an inlet end and an outlet end, and a pair of locking devices. Each of the pair of locking devices is mounted to the locking head and at least partially within one of the passageways. The locking devices are configured and oriented relative to the respective passageways so as to permit the ends of the strap to be inserted into the inlet ends of the passageways, and threaded through the passageways such that the ends emerge from the outlet ends of the passageways. The locking devices are unidirectional so as to prevent the strap ends from being pulled back through the respective passageways in a direction moving from the outlet ends back toward the inlet ends.

BRIEF DESCRIPTION OF THE DRAWINGS

FIG. 8 shows a side sectional view of the bundling strap completely secured by the locking head;

FIG. 9 is a sectional view taken along lines 9—9 of FIG. 8;

Figure 1:
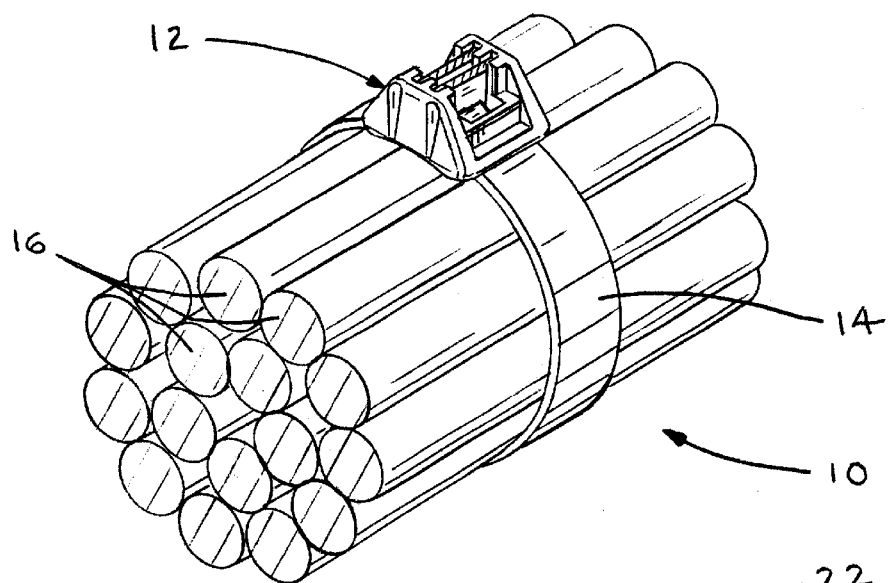
FIG. 1 is a perspective view of a cable tie of the present invention shown securing a bundle of wires.

A cable tie 10 embodying the concept of the present invention is generally shown in FIG. 1 and consists generally of a molded locking head 12 and an extruded bundling strap 14. The bundling strap is positioned to encompass the objects to be secured, such as a bundle of wires 16 shown, and each end of the strap is fixed within the locking head to secure the wires 16 in a bundle. The molded head 12 is preferably injection molded of a rigid acetal material and the strap 14 is preferably extruded of a more flexible acetal material which provides the desirable flexibility and weather resistant characteristics to the cable tie 10.

Figure 2:
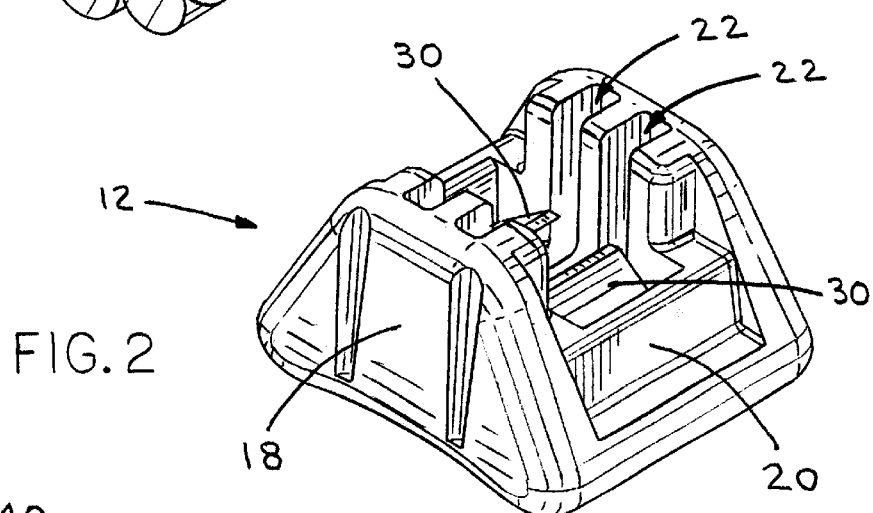
FIG. 2 is a perspective view of the locking head of the cable tie of FIG. 1.
Figure 3:
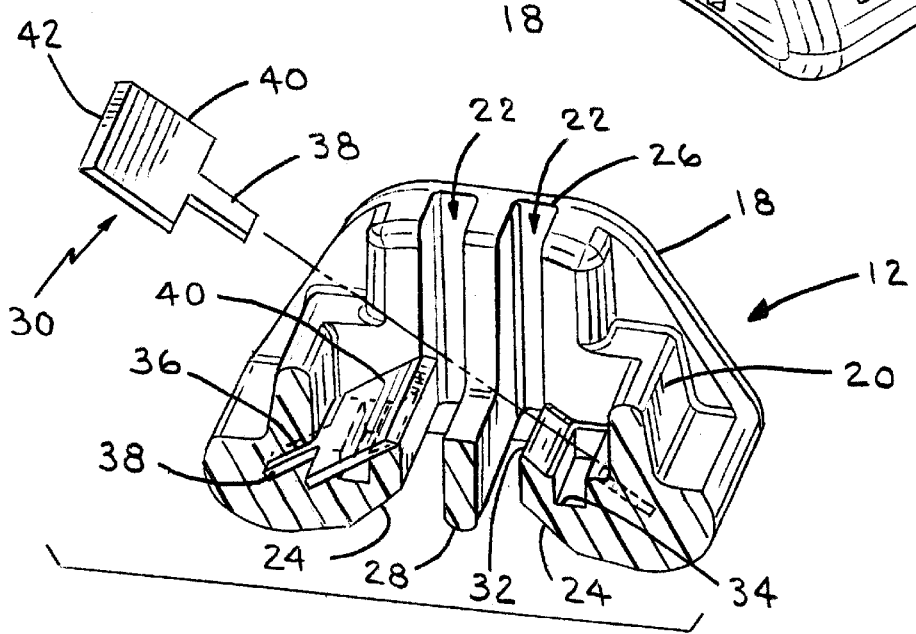
FIG. 3 is an exploded sectional view of the locking head of FIG. 1.
Figure 4:
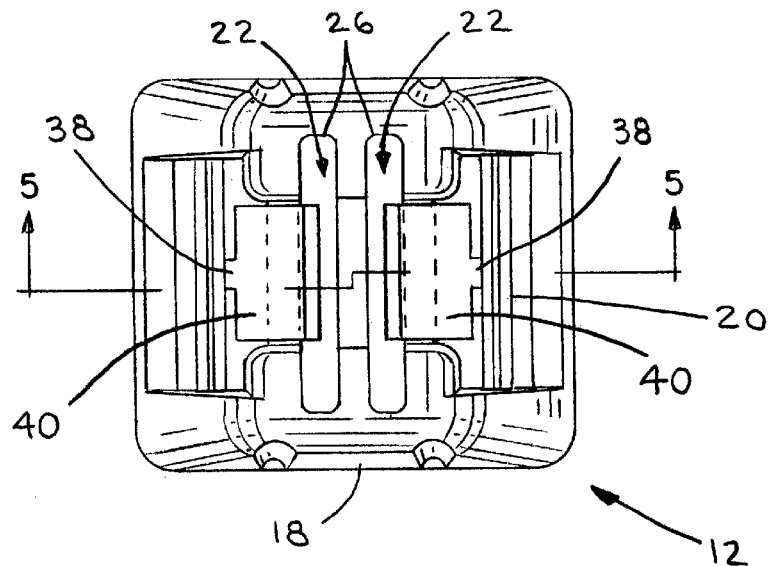
FIG. 4 is a top view of the locking head of the present invention.
Figure 5:
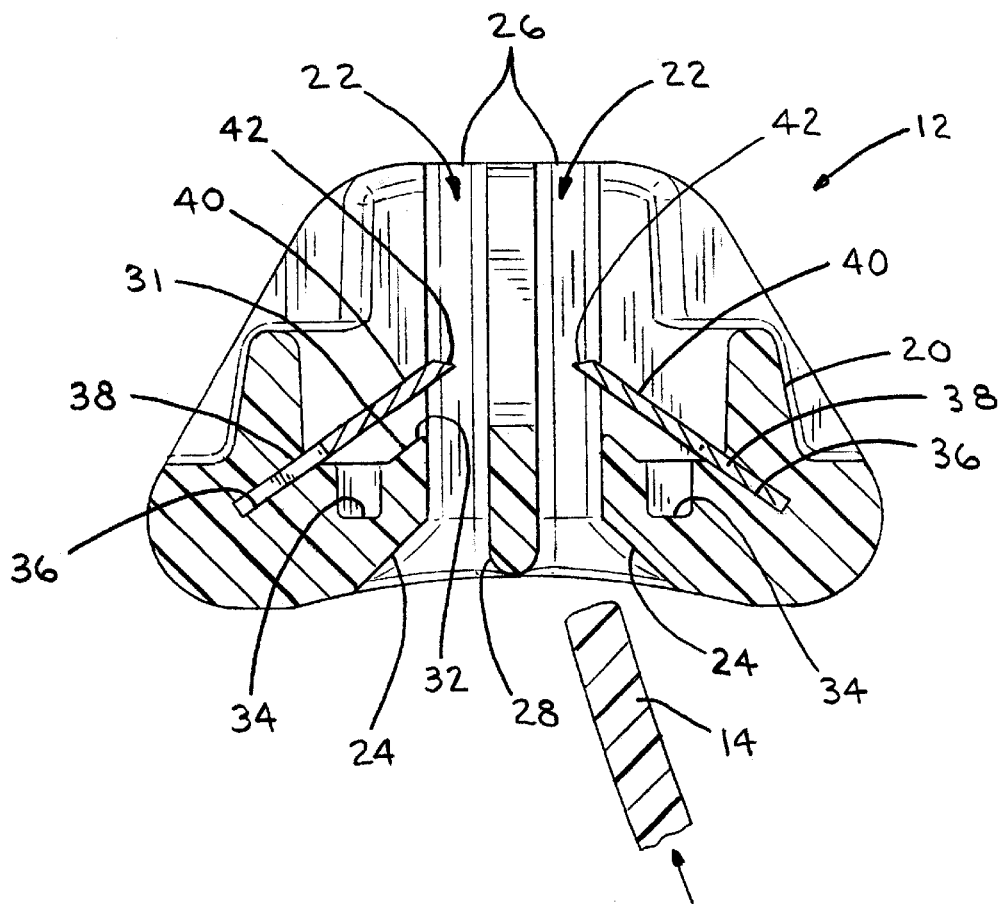
FIG. 5 is a sectional view taken along lines 5—5 of FIG. 4 shown with a partial strap portion approaching the strap entrance.
Figure 6:
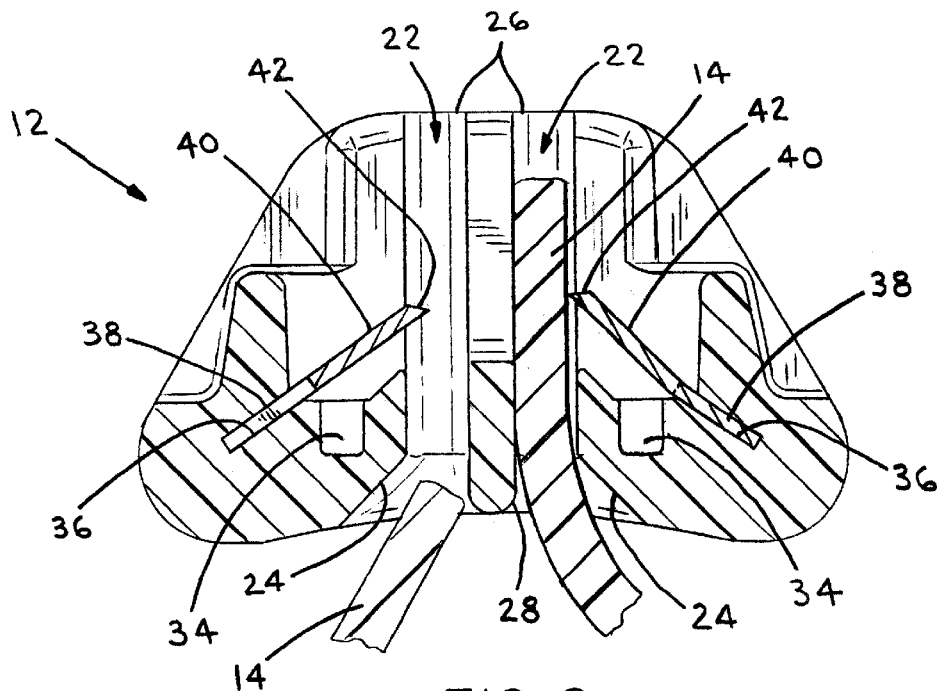
FIG. 6 is a side sectional view showing the strap portion being threaded into one side of the locking head.

As shown in FIGS. 2 and 3, the locking head 12 includes first and second longitudinal walls 18 and first and second side walls 20 interposed between and joining the longitudinal walls 18. The locking head 12 includes a pair of strap passageways 22 surrounded by walls of the locking head and extending from a tapered entrance end 24 through to a strap exit end 26. As seen in FIGS. 3 and 5, the strap passageways 22 are generally parallel passageways separated by a center wall 28. The center wall is formed perpendicular and joined to the longitudinal wall 18. First and second metal locking devices 30 are each partially inserted into and mounted within the sidewalls 20 of the locking head 12. The locking head also includes a pair of locking shelves 31, each shelf including first and second barb support surfaces 32. The barb support surfaces are inclined towards the center wall 28 and upwardly angled towards the exit ends 26 of the strap passageways 22. Each locking shelf includes a rectangular well 34 disposed between an embedded portion 36 of the locking device and the barb support surface 32. The well 34 provides manufacturing benefits by reducing the large mass of material in an area around the embedded portion 36 of the locking device 12.

Figure 7:
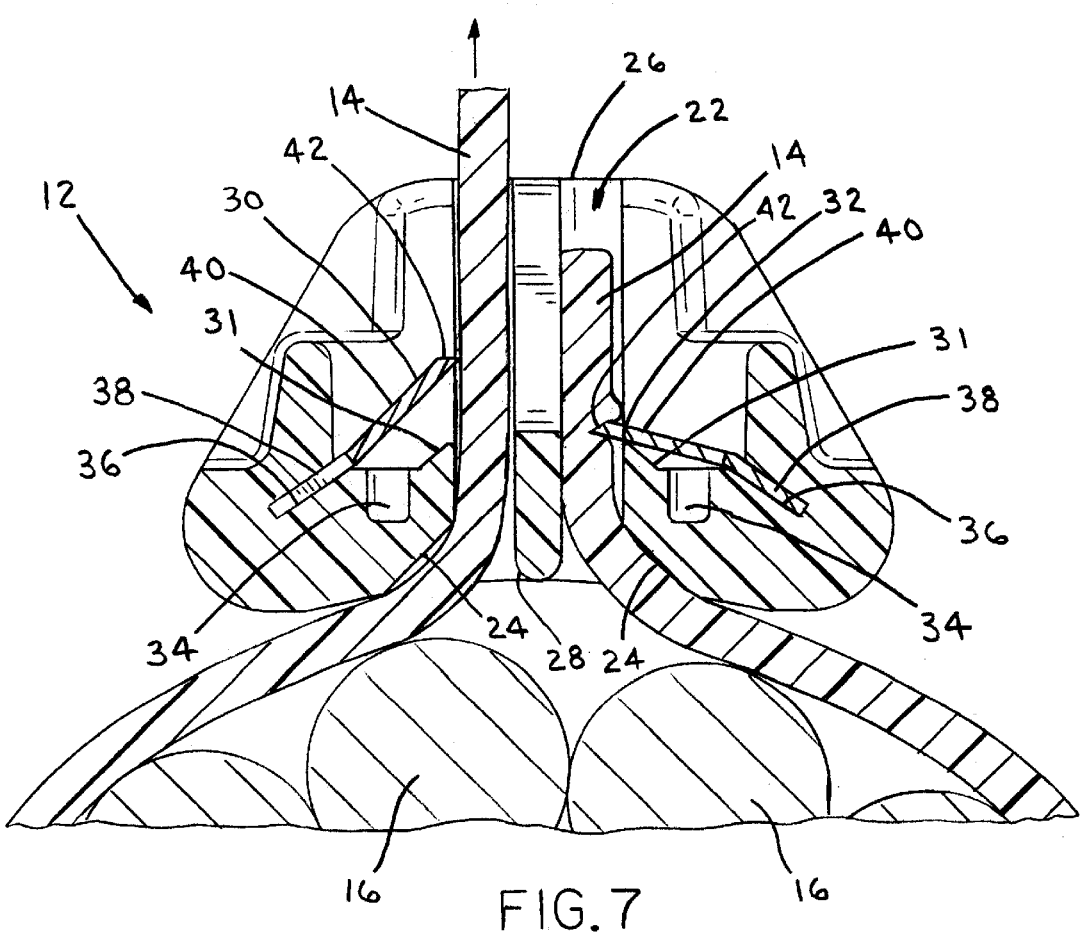
FIG. 7 is a side sectional view showing a bundling strap partially secured by the locking head.

The metal locking device 30 shown in FIG. 3 is formed having a generally T-shaped configuration. The locking device has a relatively narrow insertion end 38 which gets embedded into the sidewall 20 of the locking head. Each locking device is angularly disposed so as to have a free end 40 partially positioned within the strap passageway 22. As shown in FIGS. 5–9, the free end 40 of the locking device 30 allows for the strap to be inserted into the strap passageway 22 when threaded in one direction, but includes a knife edge 42 which will engage with the strap 14 as it is pulled in the reverse direction. It is to be noted that the free end 40 of the locking device 30 is not supported by the barb shelf 31 when the strap is either not yet inserted or during threading of the strap as shown in FIG. 5. The barb support surface 32 of the shelf 31 is spaced from the free end of the locking device a sufficient distance to allow the locking device to bend, but prevents bending fully to the horizontal portion as shown in FIGS. 7 and 8.

The width of the free end 40 of the locking device 30 is preferably ½ of the width of the strap 14. The reduced cross-section portion forming the insertion end 38 of the locking device 30 is preferably ⅕th of the width of the free end 40 of the locking device which allows a smaller barb volume to be inserted into the plastic head. The reduction in volume of the locking device entering the plastic decreases the assembly forces required. A small length of the insertion end 38 of the locking device 30 remains outside of the plastic. This unsupported reduced cross-section portion will flex easier than the larger portion of the free end, thus providing for a reduction in strap insertion forces required. Additionally, upon application of sufficient withdrawal forces, the narrow free end portion will bend before the wider portion of the free end of the locking device. The unsupported length should preferably be in the range of approximately 1.1 to 1.3 times the thickness of the locking device 30, which will allow for the more precise control of the bending point. By ensuring that the bending will occur at this reduced width portion rather than at the wider portion of the locking device, the narrow portion acts as a hinge providing for control of the point where the locking device bends. Thus, as an installed bundling strap is put under load, the locking device will dig deeper into the strap body and engage tighter. As further loading occurs, the locking device will bend at the predetermined hinge area which allows for better control of the amount of actual barb penetration into the strap. The controlling of the hinge point and the positioning of the barb shelf provides for improved control of the locking device. Controlling the amount of penetration into the strap avoids problems in the field such as strap body slippage or fracture of the strap. The preferred penetration of the locking device 30 into the strap 14 is ½ the total thickness of the strap body.

Figure 10:
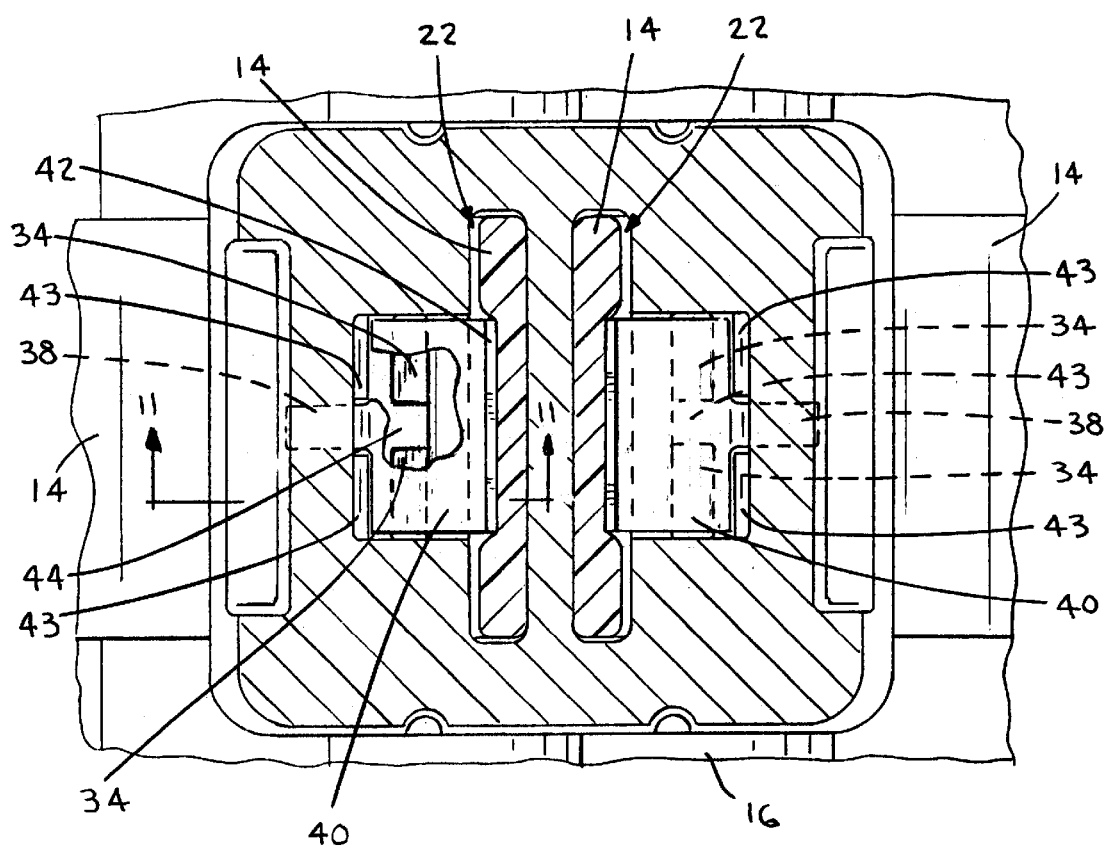
FIG. 10 is a sectional view similar to FIG. 4 of a second embodiment of the present invention.
Figure 11:
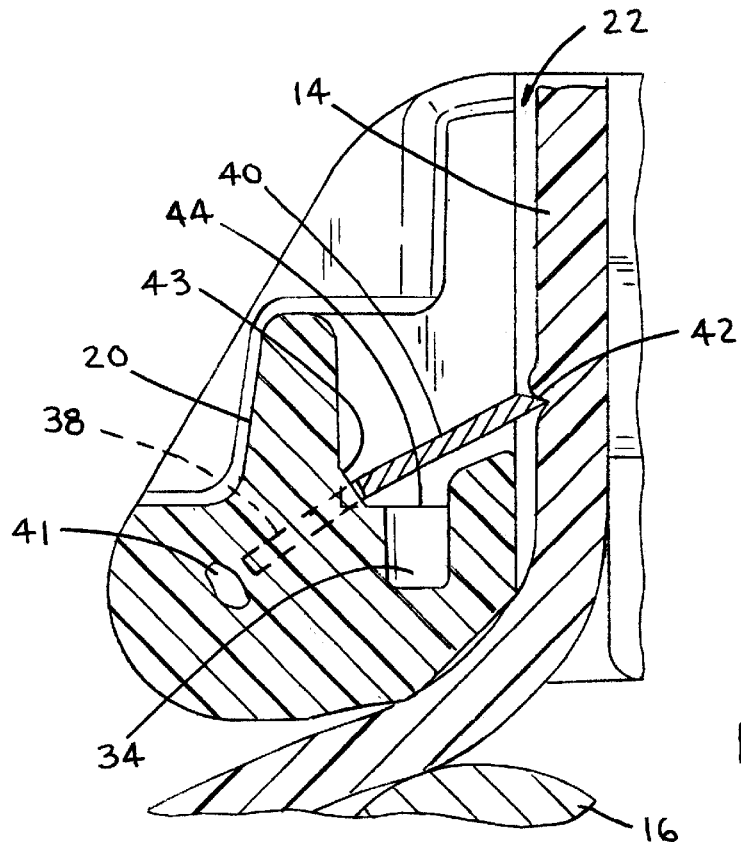
FIG. 11 is a sectional view taken along the lines 11—11 of FIG. 10.
Figure 12:
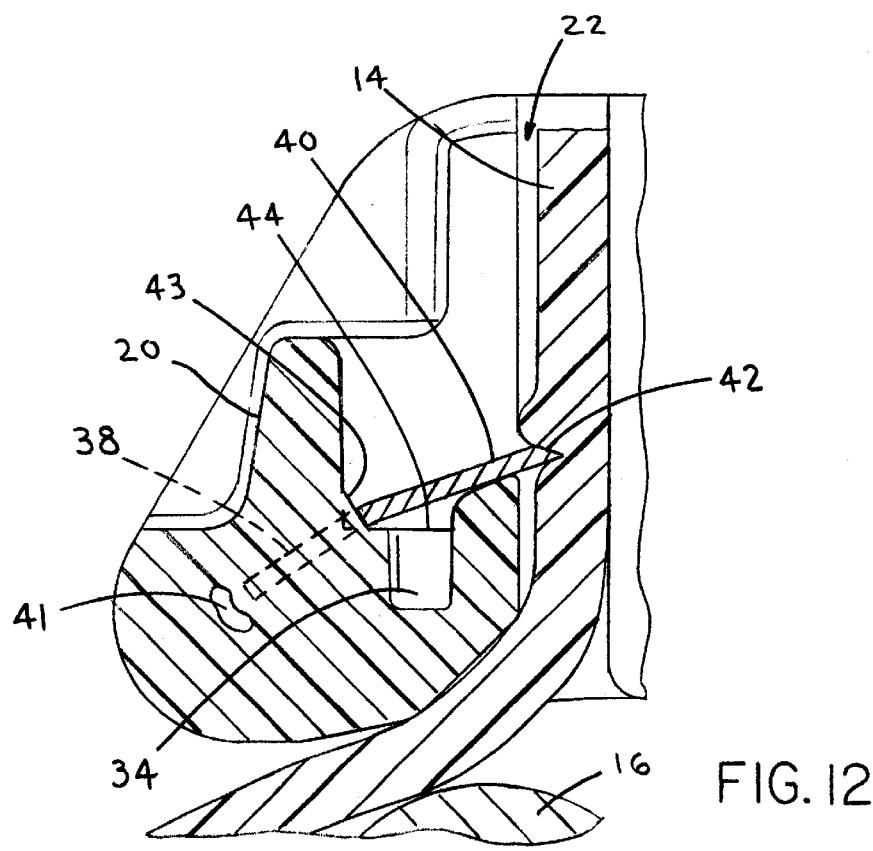
FIG. 12 is a sectional view similar to FIG. 11 shown with the tie fully loaded.

FIGS. 10–12 show another embodiment of the present invention. As discussed above, the locking head is made of acetal material which is susceptible to voids 41 which occur in thick sections of the part. Due to the strength requirements of the head design of the present invention, one area in which voids can occur is the thick section behind the insertion end 38 of the locking device 30. Thus, when a cable tie is put under a load, if voids are present behind the insertion end 38, the locking device 30 can be further pushed into the head. This results in the locking device 30 not digging into the strap 14 as deeply, which reduces the tensile strength of the tie 10. Thus, as shown in FIGS. 10–12, plastic chamfers 43 have been added where the insertion end 38 of the locking device 30 gets embedded into the sidewall 20 behind the wide free end portion 40 of the locking device 30. This allows for the previously discussed benefits of the T-shaped barb design, but the plastic chamfers will not allow the barb to push further into the head.

Additionally, as best seen in FIG. 10, a plastic rib 44 can be formed transverse to the well 34 disposed between the embedded portion of the locking device 30 and the barb support surface 32. This maintains many of the manufacturing benefits by reducing the large mass of material in an area around an embedded portion of the locking device but provides sufficient strength required for the locking head.

It is to be noted that while the preferred embodiment has been shown as a separate locking head and bundling strap made of an acetal material, other locking head designs utilizing acetal and/or nylon type materials having integrally formed or non-integrally formed straps could utilize the present invention.

While particular embodiments of the present invention have been shown and described, it will be obvious to those skilled in the art that changes and modifications may be made without departing from the invention in its broader aspects. The matter set forth in the foregoing description and accompanying drawings is offered by way of illustration only and not as a limitation.

What is claimed is:

1. A cable tie for bundling together a plurality of elongated objects, said cable tie comprising:

an elongated flexible strap having opposing ends;

a locking head defining first and second strap passageways separated by a center wall therebetween, each of said passageways having an inlet end and an outlet end; and first and second locking devices, said first locking device being mounted to said locking head on a first side of said center wall and at least partially extending within said first passageway and said second device being mounted to said locking head on a second side of said center wall and at least partially within said second passageway, said locking device being configured and oriented relative to said respective passageways so as to permit said ends of said strap to be inserted into said inlet ends of said passageways, and threaded through said passageways, such that said ends emerge from said outlet ends of said passageways, said locking devices being unidirectional so as to prevent said strap ends from being pulled back through said respective passageways in a direction moving from said outlet ends back toward said inlet ends;

wherein said first locking device is generally resilient and a portion of said first locking device is embedded within said locking head on said first side of said center wall such that the remaining unembedded portion of said first locking device is resiliently cantilevered from said embedded portion thereof, said unembedded cantilevered portion at least partially obstructing said first passageway;

wherein said second locking device is generally resilient and a portion of said second locking device is embedded within said locking head on said second side of said center wall such that the remaining unembedded portion of said second locking device is resiliently cantilevered from said embedded portion thereof, said unembedded cantilevered portion at least partially obstructing said second passageway; and wherein said first locking device is generally T-shaped, having a broad portion and a narrow portion.

2. A cable tie in accordance with claim 1 wherein said locking head includes a pair of surfaces for supporting said locking devices, said locking devices being cantilevered upon insertion of said straps through said passageways until said locking devices respectively contact said surfaces.

3. A cable tie in accordance with claim 1 wherein said embedded portion of said one locking device is generally taken from said narrow portion thereof.

4. A cable tie in accordance with claim 3 wherein said embedded portion of said one locking device generally coincides with said narrow portion thereof such that an edge of said broad portion is adjacent to said locking head proximate said cantilever.

5. A cable tie in accordance with claim 4 wherein said locking head includes a chamfered portion generally perpendicular to said one locking device in an area proximate said cantilever such that said broad portion comes generally flush with said chamfered portion of said locking head.

6. A cable tie in accordance with claim 5 wherein said broad portion and said narrow portion of said one locking device are not coplanar.

7. A cable tie in accordance with claim 1 wherein said locking head includes a well disposed proximately to each of said locking devices.

8. A cable tie in accordance with claim 7 wherein each of said wells includes a rib traversing said well for providing strength to said locking head.

9. A cable tie in accordance with claim 7 wherein said well is disposed between an embedded portion of one of said locking devices and one of said surfaces.

10. A cable tie for bundling together a plurality of elongated objects, said cable tie comprising;

an elongated flexible strap having opposing ends;

a locking head defining a pair of strap passageways, each of said passageways having an inlet end and an outlet end; and a pair of locking devices, each of said pair being mounted to said locking head and at least partially within one of said passageways, said locking devices being configured and oriented relative to said respective passageways so as to permit said ends of said strap to be inserted into said inlet ends of said passageways, and threaded through said passageways, such that said ends emerge from said outlet ends of said passageways, said locking devices being unidirectional so as to prevent said strap ends from being pulled back through said respective passageways in a direction moving from said outlet ends back toward said inlet ends;

said locking head including a well disposed proximately to each of said locking devices and a rib traversing said well for providing strength to said locking head.

11. A cable tie in accordance with claim 10 wherein said locking head includes a pair of surfaces for supporting said locking devices, said locking devices being cantilevered upon insertion of said straps through said passageways until said locking devices respectively contact said surfaces.

* * * * *

UNITED STATES PATENT AND TRADEMARK OFFICE
CERTIFICATE OF CORRECTION

PATENT NO.     : 6,532,631 B2
DATED          : March 18, 2003
INVENTOR(S)    : Rohaly et al.

It is certified that error appears in the above-identified patent and that said Letters Patent is hereby corrected as shown below:

Column 2,
Line 36, the following heading and paragraph are missing and should be included:

-- Description of the Preferred Embodiment

This Application claims the benefit of U.S. Provisional Application No. 60/184,547, filed February 24, 2000, and U.S. Provisional Application No. 60/239,493, filed October 11, 2000. --

Signed and Sealed this

Second Day of March, 2004

JON W. DUDAS
*Acting Director of the United States Patent and Trademark Office*